(12) United States Patent
Tagg

(10) Patent No.: US 11,889,351 B2
(45) Date of Patent: Jan. 30, 2024

(54) BLOCKCHAIN-BASED DYNAMIC CELLULAR NETWORK WITH PROOF-OF-SERVICE

(71) Applicant: James Tagg, Encinitas, CA (US)

(72) Inventor: James Tagg, Encinitas, CA (US)

( * ) Notice: Subject to any disclaimer, the term of this patent is extended or adjusted under 35 U.S.C. 154(b) by 0 days.

(21) Appl. No.: 18/130,752

(22) Filed: Apr. 4, 2023

(65) Prior Publication Data

US 2023/0337052 A1 Oct. 19, 2023

Related U.S. Application Data

(60) Provisional application No. 63/330,671, filed on Apr. 13, 2022.

(51) Int. Cl.
*H04W 28/06* (2009.01)
*H04W 28/02* (2009.01)
*H04W 28/082* (2023.01)

(52) U.S. Cl.
CPC ....... *H04W 28/06* (2013.01); *H04W 28/0236* (2013.01); *H04W 28/082* (2023.05)

(58) Field of Classification Search
CPC .............. H04W 28/06; H04W 28/082; H04W 28/0236
See application file for complete search history.

(56) References Cited

U.S. PATENT DOCUMENTS

| 8,781,475 | B1 | 7/2014 | McKeeman et al. |
| 9,661,080 | B2 | 5/2017 | Haleem et al. |

(Continued)

FOREIGN PATENT DOCUMENTS

| EP | 3846515 A1 * | 7/2021 | ........ H04W 36/0061 |
| WO | WO-2018199609 A1 * | 11/2018 | ........... H04B 7/0626 |

(Continued)

OTHER PUBLICATIONS

PCT AppIn. No. PCT/US23/17475; Invitation to Pay Additional Fees, and, Where Applicable, Protest Fee dated Jun. 22, 2023.

(Continued)

*Primary Examiner* — Mehmood B. Khan
(74) *Attorney, Agent, or Firm* — Kane Kessler, P.C.; Barry E. Negrin

(57) ABSTRACT

Systems and methods of establishing a decentralized dynamic cellular communication network, and the network so established. Software utilized by cellular nodes enables the nodes to communicate with each other and with user equipment, and determines cellular service quality of the cellular nodes by way of the user equipment and/or other cellular nodes. Software utilized by a plurality of validator nodes enables the validator nodes to communicate with the cellular nodes and validates the cellular service quality determined by the cellular nodes. As the cellular nodes begin utilizing the software, they are added to the network. Distributed servers peer with each other to allow network RAN and core to register and coordinate. Cellular radio access components coordinate their transmissions to user equipment to ensure minimized handoff in conditions in which the radio access components are non-stationary. Local clocks configured to each transmitter to enable secure frequency cooperation.

16 Claims, 8 Drawing Sheets

(56) References Cited

U.S. PATENT DOCUMENTS

| | | |
|---|---|---|
| 10,362,116 B2 | 7/2019 | Haleem et al. |
| 10,412,171 B2 | 9/2019 | Haleem et al. |
| 10,897,303 B1 | 1/2021 | Ananth et al. |
| 10,939,405 B1 | 3/2021 | Haleem et al. |
| 11,038,964 B2 | 6/2021 | Haleem et al. |
| 11,349,558 B2 | 5/2022 | Ananth et al. |
| 2012/0170407 A1 | 7/2012 | Crice |
| 2014/0099941 A1 | 4/2014 | Ji et al. |
| 2015/0098385 A1* | 4/2015 | Navalekar ........... H04W 64/003 370/312 |
| 2015/0200452 A1 | 7/2015 | Oh et al. |
| 2015/0207885 A1 | 7/2015 | Tagg |
| 2016/0359236 A1 | 12/2016 | Sundaram |
| 2019/0208422 A1 | 7/2019 | Haleem et al. |
| 2020/0404069 A1* | 12/2020 | Li ........................... H04L 67/59 |
| 2021/0135744 A1 | 5/2021 | Ananth et al. |
| 2022/0036302 A1* | 2/2022 | Cella ................. G06Q 10/0834 |
| 2022/0126864 A1* | 4/2022 | Moustafa .......... G08G 1/096758 |
| 2023/0078448 A1* | 3/2023 | Cella ................. G06Q 10/06311 |
| 2023/0275973 A1* | 8/2023 | Sakamoto ............... H04L 41/22 709/224 |
| 2023/0276253 A1* | 8/2023 | Niemelä ................ H04W 24/02 370/329 |

FOREIGN PATENT DOCUMENTS

| | | |
|---|---|---|
| WO | 2020014399 A1 | 1/2020 |
| WO | 2022031382 A1 | 2/2022 |
| WO | WO-2022094064 A1 * | 5/2022 |

OTHER PUBLICATIONS

PCT International Application No. PCT/US23/17475—International Search Report and Written Opinion dated Sep. 27, 2023.

\* cited by examiner

BLOCKCHAIN-BASED DYNAMIC CELLULAR NETWORK WITH PROOF-OF-SERVICE

RELATED APPLICATIONS

Priority is claimed from U.S. Provisional Patent Application No. 63/330,671 filed Apr. 13, 2022 entitled BLOCKCHAIN-BASED DYNAMIC CELLULAR NETWORK WITH PROOF-OF-SERVICE, the entirety of which is incorporated by reference herein.

BACKGROUND OF THE INVENTION

Field of the Invention

A blockchain-enabled cellular network that facilitates cooperation between network elements to maximize coverage and capacity and share service resources—while preventing harmful interference between radio elements.

Description of Related Art

Cellular services are optimized for two main purposes; covering the largest possible area and providing high capacity. They must do these two tasks with a high degree of quality of service—good handoff with a lack of deadspots and consistent throughput and low jitter in the data channel. And, they must cooperate to ensure capacity is offloaded efficiently to small cells, leaving the large cells to cover the greatest area. Existing distributed wireless systems have concentrated on coverage area but this does not capture the complexity of a full cellular network.

In the case of modern private networks, such as those based in the United States using Citizens Broadband Radio Service (CBRS), they ensure noninterference by negotiating small private networks that don't encroach on their neighbors' radio space. The networks are configured as islands able to coordinate RAN and services between themselves on an intranet basis but unable to handoff between networks—an internet operation. This is inherently wasteful of the spectrum resource as large physical guard bands are established between different networks. The guard-band method is suboptimal as continuous coverage is desired by users who are accustomed to continuous cellular coverage—albeit with the occasional dropouts and coverage blackspots. Worldwide, many countries are adopting similar solutions to the current wasteful allocation of spectrum on a national basis, including a broad range of spectrum sharing plans. This instant invention described herein aims to provide tools to aid with this.

There are unique challenges in building a cellular network that is defined dynamically rather than statically. In most networks, the RAN and core network (core) have fixed topography and topology. Network element are connected to a single logical Mobility Management Entity (MME) which manages the assignment of handsets to radio resources and balances the load, however, this is not possible in autonomous systems. Logical entities may have multiple physical hardware instances for redundancy but operate as one unit.

These RANs may not be part of a single corporate hierarchy that reports to a central management structure, but rather operate on a distributed autonomous basis—in small groupings or even as individual units.

In the above cases, the network's logical and physical layout may be constantly changing and the operation is facilitated by different potentially unconnected network elements—MME, Internet Protocol (IP) multimedia (IMS) systems, and the like. This presents a significant problem in cooperation between the elements to prevent interference and ensure continuity of services such as voice calls, data sessions, and the reliable delivery of short message service (SMS) aka 'texts', and Multi-media services (MMS).

Traditionally, the solution to this problem has been to assume each radio asset is its own private network; not interacting with any other. For example, when systems are deployed on boats in the ocean, they backhaul using satellite links and transmit a cellular signal to local users on the boat. As the ship leaves international waters and docks in the harbor, the system is switched off and customers move to land-based networks. This is done because the boat-based system is, most likely, on a frequency in use by the land-based network, and the boat system would interfere. Calls and data sessions are severed during this transition.

Many of the services provided by cellular networks are quite complex in nature in particular, voice termination, emergency services (911, 112, 999), and lawful intercept. Individual cells or small private networks are unlikely to be able to provide these services alone.

Private networks are being built by many corporations using CBRS spectrum in the USA and a variety of shared spectrums worldwide. These private networks do not roam onto each other and because they are essentially small networks, often don't implement important services such as e911, SMS, lawful intercept and comprehensive connection to the pubic switch telephony network (PSTN) aka the phone service. Therefore there is a need for a cellular network that enables distributed cooperation and the prevention of harmful interference at the radio layer, while cooperating to offer advanced services and continuity of service between node elements.

Current blockchain protocols for managing radio networks fail to capture the complexity of modern cellular networks. Proof of coverage systems such as taught in U.S. Ser. No. 10/939,405 to Haleem et al. deploy a consensus-based protocol using a metric for the size of the coverage area. However, the correct 'goodness' metric for a cellular network is a complex mix of both absolute coverage, data capacity, and the efficiency of handoff between network elements. If the elements are owned by different entities a fair accounting needs to be handled between the networks. In a distributed blockchain-based network every node in the network may have different ownership and an efficient mechanism needs to be in place to manage this. Present networks implement a one size fits all system that does not permit location-based cellular pricing other than by a very digital procedure called Location Area Code (LAC) restriction. This is implemented to prevent competing cellular operators from cooperatively offering each other coverage even when a cooperation agreement is in place, effectively refusing to buy or sell coverage at any price in certain locations.

There is thus a long-felt need to establish a dynamic cellular network to implement:
1. A network that is configured in near real-time—in the order of milliseconds to minutes—to maximize service, minimize interference and share common resources;
2. Proof of coverage protocol to incentivize miners to build and coordinate their RAN coverage;
3. Sharing commonly needed interconnects based on a trust relationship established on a distributed ledger;
4. A lightweight, low-power, hybrid phased array, parabolic antenna radio system provides directional coverage to improve both capacity and range.

5. Software techniques to aid cooperation between multiple radio components.
6. A blockchain-enabled marketplace for said coverage.
7. The ability to lose connection to any central authentication resource and maintain network operation.

SUMMARY OF THE INVENTION

Presented are methods that can be implemented in a distributed manner and coordinated by a protocol and blockchain.

The instant disclosure predominantly refers to 4G network element names. It should be apparent to someone skilled in the art that the techniques described here apply to 5G networks and mapping of the naming convention is provided below. A preferred embodiment would implement the system in a 4G/5G agnostic manner so as to support both 4G and 5G handsets. For example, using Open5GS or Meta's Magma stack. It would even be possible to implement legacy 3G and 2G interoperability using the techniques described here. The generic name for a mobile phone in the standards is user equipment (UE) and covers all cellular connected devices including but not limited to; phones, watches, tablets, access points, embedded systems such as in vehicles and machinery. Any mention of phone in this disclosure is done for clarity of reading and can be substituted for user equipment.

| 4G Element Name | 5G Element Name |
| --- | --- |
| MME-Mobility Management Entity | AMF-Access and Mobility Management Function |
| HSS-Home Subscriber Server (Auth) | UDR-Unified Data Repository |
| | AUSF-Authentication Server Function |
| PCRF-Policy and Charging Rules Function | PCF-Policy and Charging Function |
| SGWC-Serving Gateway Control Plane | SMF-Session Management Function |
| SGWU-Serving Gateway User Plane | UPF-User Plane Function |
| PGWC/SMF-Packet Gateway Control Plane | SMF-Session Management Function |
| PGWU/UPF-Packet Gateway User Plane | UPF-User Plane Function |
| LCS-Location Service | LCS-Location Service |
| | NRF-NF Repository Function |
| | UDM-Unified Data Management |
| | NSSF-Network Slice Selection Function |
| | BSF-Binding Support Function |

A cooperation marketplace is needed to exchange coverage at a fair market rate for a given location. Through such an exchange disparate networks can come together to trade tokenized units of cellular service and cooperate efficiently on a handoff and load balancing.

Dynamic Network

The present invention implements authentication, authorization, and accounting services (AAA) and common intra-network cellular interfaces (such as X2) to allow cooperative implementation of radio access layer (RAN) along with IP multimedia subsystem (IMS) services to allow cooperative processing of calls over the public switched telephone network (PSTN), including emergency services, public land mobile network (PLMN) calls and short message service (SMS) and access to data on both home and visited networks. In addition, optimized hybrid phased-array steerable radio assets are implemented to work in the scheme and best use the available radiofrequency.

At the radio layer a computationally defined distributed cooperating network allows all radio assets within the system to understand their aggregate effect on the radio frequency spectrum both spatially and temporally and efficiently utilize that spectrum, whether from the same network entity or different network entities. In the case of different network entities, the networks can share service interconnects to optimally route user traffic.

A dynamic cellular communication system for securing cooperation between disparate cellular radio assets includes distributed servers that peer with each other to allow network RAN and core to coordinate. The distributed servers coordinate using a protocol. Further, the dynamic cellular communication system includes a hyper-hybrid network of multiple transmitters and receivers across terrestrial and/or aerospace platforms that work in conjunction to maximize data service. Furthermore, the dynamic cellular communication system includes a plurality of cellular radio access components that coordinate their transmissions to the individual user equipment to ensure minimal handoff in conditions wherein the radio access components is in constant motion. Moreover, the dynamic cellular communication system includes accurate local clocks configured to each transmitter to enable phase synchronous frequency cooperation and time-based anti-interference.

Hybrid Computational Phased Array Antenna

A dynamic network will often employ ultra-large cells to provide the backbone of the network. These cells need to coordinate their radio footprint with active techniques to both achieve high link budgets and avoid harmful interference with the neighboring systems. Parabolic antennas present the theoretically most efficient directional radiating source but are difficult to steer as they must be mechanically directed. Banks of electrically steerable antennas—phased arrays—offer a solution but present difficulties in power consumption and weight. U.S. patent Ser. No. 10/897,303 to Ananth et al. described such a system. The system uses a hybrid parabolic, phased array ideally suited to high altitude installation such as high towers, aerostats, and HAPS platforms but also applicable in small-scale deployments such as rooftop and even inside buildings. Directional antennas may provide no increased effective isotropic radiated power (EIRP) due to EIRP limits but they will produce lower multipath for transmission and increase receive sensitivity. Given that user equipment is limited in both transmit power and directional transmission receive sensitivity is often the most important factor.

Distributed Cellular Authentication in a Blockchain Network

A cellular system is inherently a hierarchy. A database of pre-shared keys is established by the subscriber identity module (SIM) provider. One key is sent to the mobile operator via an encrypted distribution system such as pretty good privacy (PGP) while the other is programmed into the SIM or sent to an eSIM over an encrypted distribution mechanism certified by the Global System for Mobile Communication Association ('the GSMA'). A distributed network powered by blockchain is essentially non-hierarchical. A method of authentication is needed that permits the non-hierarchical system to use a security system envisaged for a hierarchical network. This is important as billions of mobile systems are already deployed using the GSMA pre-shared key authentication mechanism. The proposed mechanism uses Mu and eSIM to facilitate distributed authentication.

The invention includes a computer-based system of establishing a decentralized dynamic cellular communication network. First software is utilized by each of a plurality of cellular nodes. The first software enables each of the cellular nodes to communicate with other of the cellular nodes and with cellular user equipment within range; and determines cellular service quality of the respective cellular nodes by way of at least one of the cellular user equipment and other of the cellular nodes. Second software is utilized by a plurality of validator nodes each residing on a computer. The second software enables the validator nodes to communicate with the cellular nodes; and validates the cellular service quality determined by the cellular nodes. As the cellular nodes begin utilizing the first software, the cellular nodes are dynamically added to the decentralized dynamic cellular communication network. In this context, "cellular node" includes any service-providing RAN device, and RAN means the radio access devices and their associated management layers such as, for example, the MME in 4G. In this context, "validator node" includes any core node or device capable of calculation. Indeed, even user handset equipment can function as a validator node running the appropriate software.

The first software includes at least one of a configuration file pointing to the decentralized dynamic cellular communication network or an app downloaded by the cellular node to connect to the decentralized dynamic cellular communication network.

The determining of cellular service quality includes at least two of radio footprint, contiguous footprint, and bandwidth. Validating the cellular service quality uses one or more cellular location technologies along with user equipment reports.

The system employs a blockchain consensus mechanism, and the blockchain consensus mechanism validates new blocks based on a consensus of a subset of the cellular nodes based on the service quality. Optionally, the cellular nodes self-verify their wireless service; the verifications are audited by the cellular user equipment connected to the cellular nodes; each of the self-verifying cellular nodes receives a token for verifying coverage according to a proof of service function; and the self-verifying cellular nodes stake tokens against a subsequent audit by the validator nodes connected to the cellular user equipment.

The proof of service function preferably includes a function that calculates a score based on cellular quality metric from the following set of parameters: range_adjusted_throughput, successful_handoff_score, QoS, first_mover_bonus, seed_node.

The invention also includes a computer-based method of establishing a decentralized dynamic cellular communication network, comprising the steps of: providing first software to each of a plurality of cellular nodes; enabling, with the first software, each of the cellular nodes to communicate with other of the cellular nodes and with cellular user equipment within range; determining cellular service quality of the respective cellular nodes by way of at least one of the cellular user equipment and other of the cellular nodes; providing second software to a plurality of validator nodes each residing on a computer; enabling, with the second software, the validator nodes to communicate with the cellular nodes; validating, with the second software, the cellular service quality determined by the cellular nodes; and dynamically adding the cellular nodes to the decentralized dynamic cellular communication network as they begin utilizing the first software. In this context, "cellular node" includes any service-providing RAN device, and RAN means the radio access devices and their associated management layers such as, for example, the MME in 4G. In this context, "validator node" includes any core node or device capable of calculation. Indeed, even user handset equipment can function as a validator node running the appropriate software.

The first software preferably includes at least one of a configuration file pointing to the decentralized dynamic cellular communication network or an app downloaded by the cellular node to connect to the decentralized dynamic cellular communication network.

The determining of cellular service quality step including utilizing at least two of radio footprint, contiguous footprint, and bandwidth. The validating the cellular service quality step including utilizing one or more cellular location technologies along with user equipment reports.

Optionally, the inventive method further comprises the steps of: employing a blockchain consensus mechanism; and validating, via the blockchain consensus mechanism, new blocks based on a consensus of a subset of the cellular nodes based on the service quality. Optionally, the method further comprises the steps of: the cellular nodes self-verifying their wireless service; auditing the verifications by the cellular user equipment connected to the self-verifying cellular nodes; each of the self-verifying cellular nodes receiving a token for verifying coverage according to a proof of service function; and the self-verifying cellular nodes staking tokens against a subsequent audit by the validator nodes connected to the cellular user equipment. Optionally, the method further comprises the step of the proof of service function calculating a score based on cellular quality metric from the following set of parameters: range_adjusted_throughput, successful_handoff_score, QoS, first_mover_bonus, seed_node.

The invention further includes a non-transitory computer-readable storage medium, comprising one or more programs for executing a computer-based method of establishing a decentralized dynamic cellular communication network via one or more processors, in which the computer-based method: provides first software to each of a plurality of cellular nodes; enables, with the first software, each of the cellular nodes to communicate with other of the cellular nodes and with cellular user equipment within range; determines cellular service quality of the respective cellular nodes by way of at least one of the cellular user equipment and other of the cellular nodes; provides second software to a plurality of validator nodes each residing on a computer; enables, with the second software, the validator nodes to communicate with the cellular nodes; validates, with the second software, the cellular service quality determined by the cellular nodes; and dynamically adds the cellular nodes to the decentralized dynamic cellular communication network as they begin utilizing the first software. In this context, "cellular node" includes any service-providing RAN device, and RAN means the radio access devices and their associated management layers such as, for example, the MME in 4G. In this context, "validator node" includes any core node or device capable of calculation. Indeed, even user handset equipment can function as a validator node running the appropriate software.

Optionally, the first software includes at least one of a configuration file pointing to the decentralized dynamic cellular communication network or an app downloaded by the cellular node to connect to the decentralized dynamic cellular communication network.

Optionally, the non-transitory computer-readable storage medium further enables the computer-based method to determine cellular service quality by utilizing at least two of radio footprint, contiguous footprint, and bandwidth. The computer-based method optionally further validates the cellular service quality by utilizing one or more cellular location technologies along with user equipment reports. Optionally, the computer-based method further: employs a blockchain consensus mechanism; and validates, via the blockchain consensus mechanism, new blocks based on a consensus of a subset of the cellular nodes based on the service quality. The inventive non-transitory computer-readable storage medium further enables the computer-based method to include that: the cellular nodes self-verify their wireless service; the cellular user equipment connected to the self-verifying cellular nodes audits the verifications; each of the self-verifying cellular nodes receive a token for verifying coverage according to a proof of service function; and the self-verifying cellular nodes stake tokens against a subsequent audit by the validator nodes connected to the cellular user equipment. Optionally, the proof of service function calculates a score based on cellular quality metric from the following set of parameters: range_adjusted_throughput, successful_handoff_score, QoS, first_mover_bonus, seed_node.

The invention further includes a dynamic cellular communication system enabling cooperation between disparate cellular radio assets to coordinate radio spectrum and utilize radio services. Distributed servers peer with each other to allow network RAN and core to register and coordinate, wherein the distributed servers are deployed with a protocol. A plurality of cellular radio access components, each having a transmitter, coordinate their transmissions to an individual user equipment to ensure minimized handoff in conditions in which the radio access components are non-stationary. Local clocks are configured to each of the transmitters to enable secure frequency cooperation.

Optionally, the inventive dynamic cellular communication system derives the frequency cooperation from a process of trial and error in a frequency-division multiplexing spectrum usage condition. Optionally, the system further comprises a cooperative interface for coordinating radio networks to share common interconnects using a distributed ledger. The dynamic network is optionally enabled with a blockchain service.

Optionally, at least one of the transmitters includes a lens and multiple feeds in an array arranged in a ring offset from an unfolded one-dimensional parabolic surface engaged in beam steering, wherein the feeds are at least one of fractal patch antennas or dipoles. Optionally, the power of the feeds is adjusted to create a fixed cell edge boundary, and the signal strength of the beams is dynamically changed to effectively change the boundary location of cells. Optionally, the power of the feeds is adjusted to create a controllable edge boundary that can be matched to at least one of fixed geometry or the edges when the cell location and orientation are moving. Optionally, the beam steering arrays includes a set of hybrid antennas configured to direct the beam by forming a virtual parabola to focus the beam.

The present invention deploys a protocol on distributed servers. The said servers peer with each other using the protocol based on the Open RAN specifications (O-RAN) to allow network RAN and core to register and coordinate. A key advantage of distributing the servers is a lack of a single, central point of failure and avoiding pooling user data in a central location. This reduces the security risks and may be necessary to support the regulations of specific countries. Conversely, the distributed mechanisms may permit regionally mandated services such as 112/911/999 interconnect to be performed by one of the partners within the geographic area rather than implemented repeatedly.

The invention includes systems and methods for establishing a dynamic cellular communication system using a blockchain consensus mechanism includes calculating service quality of one or more cellular nodes from a combination of radio footprint, contiguous footprint, and bandwidth. Further, the invention includes validating the said service quality using one or more cellular location technologies along with user equipment reports. Furthermore, the invention includes validating new blocks based on a consensus of a subset of the cellular nodes based on the service quality.

The invention includes a dynamic cellular network to facilitate cooperation between elements of a cellular network on an inter-network basis, enabling distributed cooperation and prevention of harmful interference at the radio layer. The method for establishing a dynamic cellular communication system uses a blockchain consensus mechanism to establish trust between elements and connect the elements using an X2 interface to exchange ICIC and fast handoff signaling. The method includes validating new blocks based on a consensus of a subset of the cellular nodes based on the service quality.

The invention also includes a Proof-of-Service scheme to facilitate the construction of an optimum cellular network. The method for establishing a cellular communication system using a blockchain consensus mechanism includes calculating service quality of one or more cellular nodes from a combination of radio footprint, contiguous footprint, and bandwidth. Further, the method includes validating the said service quality using one or more cellular location technologies along with user equipment reports. Furthermore, the method includes validating new blocks based on a consensus of a subset of the cellular nodes based on the service quality. Cellular connectivity is traded using a blockchain-enabled distributed ledger to allow equitable trading of service between disparate distributed and legacy networks.

The invention also includes a Hybrid Parabolic Phased Array Antenna that implements a one-dimensional computationally driven linear phased array with a one-dimensional parabolic dish providing a steerable, light-weight, and low-power array. The array is fully steerable in one dimension while passively controlled in the other dimension. a second linear array can be deployed to make the array tiltable without adding a full two-dimensional overhead. These arrays can be used individually or in sector arrangements in a single layer or multiple layers with each layer arranged to provide concentric rings of coverage.

The invention also includes authentication in cellular networks, performed centrally using one or more replicated home location registers which implement authentication for the entire user base of a cellular network operator. This is incompatible with a distributed network where individual radio assets would wish to authenticate users locally. Distributed authentication is important as the central HLR/ALU may be rendered unreachable for example, during a natural emergency. A robust distributed authentication schema is described using holomorphic encryption.

A distributed cellular system should employ a Proof-of-Service scheme to accommodate all the competing demands on the network, secure nodes, and establish a trust between nodes. Once trust is established, networks nodes can exchange cooperation data over standardised interfaces such as X2, S8, to allow interoperation between elements to maximise radio access network (RAN) coverage efficiency and share interconnect and service capability. The Proof-of- Service protocol implements rewards—tokens—for different aspects of network service provisions to encourage full cellular network growth.

In a dynamic network, transmission is provided by RAN and core networks that are reconfigurable in use. In the most extreme physical case, the elements may be housed on aircraft, airships, boats, trains, trucks, cars, and satellites or; the elements may be managed by individual users who move and reconfigure them at will. RAN elements may be providing service at widely different scales; from super macrocells in satellites and high altitude platforms (HAPs) to personal microcells serving just a few users.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF DRAWINGS

In the accompanying figures, similar reference numerals may refer to identical or functionally similar elements. These reference numerals are used in the detailed description to illustrate various embodiments and to explain various aspects and advantages of the present disclosure.

FIG. 4 illustrates the problem with high-altitude signals.

FIG. 7 is a drawing of a Hybrid Phased Array with a parabolic scheme (flat orange peel), according to the embodiments as disclosed herein.

FIG. 10 is a drawing of a Split Lundberg Antenna scheme, according to the embodiments as disclosed herein.

DETAILED DESCRIPTION OF THE INVENTION AND DRAWINGS

Description will now be given with reference to the attached FIGS. 1-12. It should be understood that these figures are exemplary in nature and in no way serve to limit the scope of the invention, which is defined by the claims appearing hereinbelow.

A dynamic cellular network facilitates cooperation between distributed cellular assets to coordinate radio spectrum and share commonly needed interconnects based on a trust relationship on a distributed ledger. Optimized radio antenna elements effect long-range coverage.

The following detailed description is intended to provide example implementations to one of ordinary skill in the art and is not intended to limit the invention to the explicit disclosure, as one of ordinary skill in the art will understand that variations can be substituted that are within the scope of the invention as described.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described herein.

Figure 1:
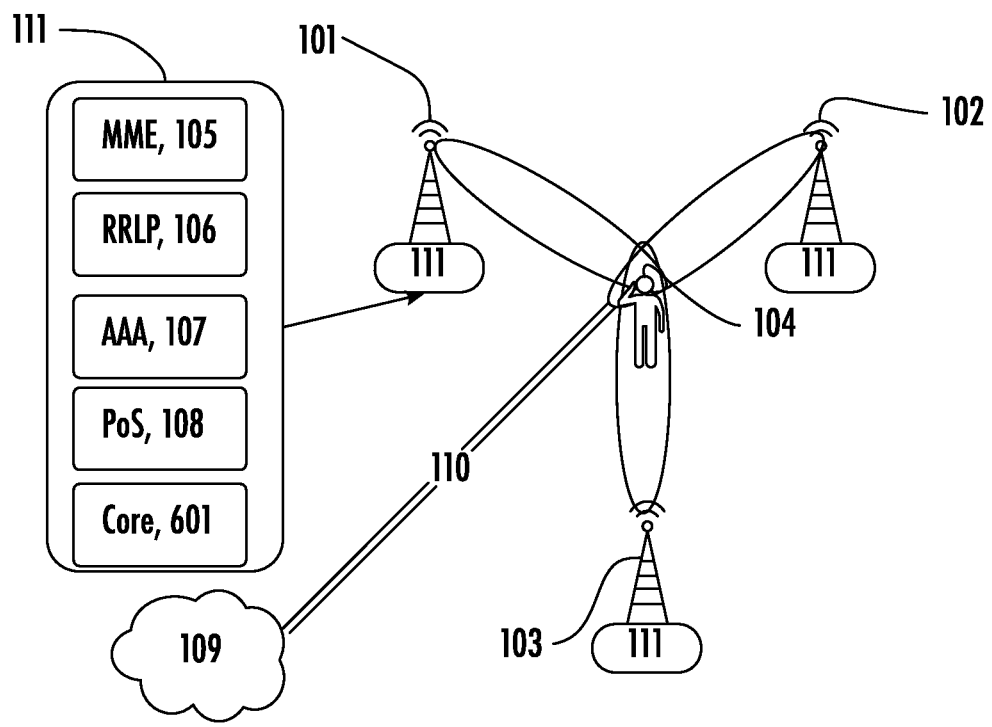
FIG. 1 is a system diagram illustrating the Proof-of-Service scheme, according to the embodiments as disclosed herein.

FIG. 1 is a system diagram illustrating the Proof-of-Service (PoS) scheme, according to the embodiments as disclosed herein. Further, FIG. 1 shows a preferred subset of s cellular wireless system employed to provide a Proof-of-Service scheme in a distributed network. The illustrated architecture references 4G network entities but can be readily deployed on any generation of cellular service with elements names modified appropriately. A table of 4G to 5G naming mappings was presented earlier.

Cellular services are optimized for two main purposes: covering the largest possible area, and providing high capacity data throughput. They must do these two tasks with a high degree of quality of service (QoS) in both time and space. Space: coverage should be ubiquitous—without holes—as the user equipment (UE) moves within the area of coverage. Time: coverage should have stable consistent bandwidth and jitter. In addition, the cellular system should cooperate to ensure capacity is offloaded efficiently to small cells leaving the large cells to cover the greatest area. Therefore, the capacity of the system alone is not a good measure of 'goodness', nor is coverage alone. Further, there are cooperation arrangements needed between cells. In integrated access and backhaul (IAB) scenarios, feed for downstream cells is provided by one or more initial upstream cells connected to the Internet. Each cellular node then meshes with others to form the network. Mesh protocols can include LibreMesh, Freifunk open-mesh and others. In extreme cases, the network should function even if no link to the Internet can be made. This is the fully autonomous, enterprise, or emergency use case. A more detailed description of authentication in this scenario is described in FIG. 11.

Miners build the network by installing nodes. It is highly beneficial to network growth for there to be a first move incentive to cover, so called, 'not spots'—areas of no coverage—despite the fact that the initial cell may not achieve the economies of scale necessary to encourage users.

The PoS scheme is implemented to reward these different aspects of network service provisions and to encourage network growth.

The Proof-of-Service function proposed herein scores the participation of each network node in the performance of the overall network function. In the system, miners provide coverage by erecting RAN nodes which gain tokens from providing service to users. They receive tokens and prove their voting value to the network for generating new blocks according to the Proof-of-Service scheme. This takes the place of the older Proof-of-Work schemes such as is implemented for Bitcoin or Ethereum or Proof-of-Coverage schemes that merely target radio footprint without any consideration of capacity, quality, handoff and load balancing.

Each RAN asset 101, 102, and 103 has a logically associated core 111. A full node implements most or all elements including the cellular full core 601 and in particular the itemised elements 105-108. A subnode can implement a subset of these functions and delegate overall functions to a connected full node.

Proof-of-Service (PoS) 108 is a function implemented within a node that calculates a score based on cellular quality metric from the following set (range_adjusted_throughput (capacity), successful_handoff_score, QoS, first_mover_bonus, seed_node). Additional metrics may be specified from time to time as the network evolves. An algorithm computes an overall score based on the weighted combination of the parameters which are the subject of a function. In general, an exemplary such function would be of the form $y=ax+bx^2+cx^3$ for each parameter, and parameters could be linearly combined or non-linearly combined, where the state of one parameter might influence the weighting of any other parameter. In an exemplary simple form, the score would be a linear weighted addition of the parameters for example (a*range_adjusted_throughput+b*successful_handoff_score+c*QoS+d*first_mover_bonus+e*seed_node). This or a similar algorithm is then used to achieve consensus and write blocks to a blockchain based on the nodes scores in a similar manner to Proof-of-Work schemes. This forms a robust blockchain-enabled cellular network. The mining reward system that computes the PoS may evolve over time by changing the reward function but to allow for mining certainty, it is guaranteed the function will not change faster than a certain rate and that it will stay within certain bounds for a length of time. For example, it is guaranteed that the first_mover reward is at least three years even though the first-mover benefit to the network might erode rapidly. First-mover means the first cell that initiates coverage further than a distance d from any other cell or in a new country or territory. Telecom territories are defined from time to time by the ITU which serves as an oracle.

Range adjusted capacity (throughput) (RAC) is a function that increases the capacity score for bits served at a high range from the cell. This promotes cells providing contiguous area coverage. In a preferred embodiment, the system implements the RAC using range determined from the Radio resource location services (LCS) implemented by cellular networks using the radiolocation protocol (RRLP) 106 which exchanges messages between a handset and serving Mobile Location Center in order to provide the geolocation information to pinpoint the exact geolocation of the target's mobile phone. This is either provided by triangulation between masts 101, 102, and 103 to a user 104 using the retardation timing in the cellular interface or by a hybrid solution, needing both the handset and the network which includes: Assisted GPS (wireless or television) allows the use of GPS even indoors, Advanced Forward Link Trilateration (A-FLT), Timing Advance/Network Measurement Report (TA/NMR), Enhanced Observed Time Difference (E-OTD). In areas such as tunnels and buildings, or anywhere else that GPS is not available or reliable, wireless carriers can deploy enhanced location determination solutions such as Co-Pilot Beacon for CDMA networks and LMU's for GSM networks.

It is very difficult to fake this radiolocation data as it is generated deep within complex server processes, is constantly changing, and is used for other important services such as emergency location and law enforcement purposes. Thus in normal use, the self calculated PoS along with normal protections to ensure that the code generating the PoS is the correct version can be used. Nodes can implement challenge and response methods to ensure other nodes are valid and nodes on the network use a consensus protocol to know the correct current valid hash for a valid node or may use Github compiled image as an oracle.

On top of these protections visiting users will authenticate, authorize, and report their location (AAA) 107 on the visited network to their home network and generate both handset location information Radio resource location services (RRLP) 106 that is tunneled 110 back to their home servers AAA service 109. The home core 109 has the same functions at the visited node 111 and operates through normal cellular roaming mechanism or the RAN element 111 can operate as a sub node and delegate its management to a home core 109 using the S1 interface. In that instance the RAN and Core might be the same logical entity presenting a security risk to the consensus protocol. The LCS information that is generated by the visited network is cross-referenced with the home network and handset information to ensure the system has not been tampered with. Nodes stake their tokens while self-authenticating and may lose those stakes if they are found to be misreporting status. This is in accordance with the Proof-of-Stake mechanisms that are implemented in networks such as Cardano and indeed in a preferred embodiment the system is built upon Cardano to take advantage of prewritten proof of stake mechanisms.

Successful_handoff_score benefits cells that offer capacity at the range on a contiguous basis—that is to say, they have been set up to avoid coverage holes. Handoff is implemented either node to node using the X2 interface or by the S1-MME interface. Handoff scores are automatically written by these elements and these are used to compute the handoff success metric. Again handoff is reported to the home network which performs an audit function.

QoS may either use the generally accepted GSM QoS level or a bit error rate and jitter figure—also defined within the GSM radio link specification.

first_mover_bonus is a bonus given to the first person to cover a coverage hole and begin the process of filling that area.

seed_node is a node which will provide other nodes with coverage in a mesh.

There is a potential economic disincentive to handoff—it would help to hang on to a customer using data at the extreme edge of coverage—this possibility is mitigated by the handoff bonus.

The seed_node provides the backhaul to the Internet in an IAB (or Microwave) mesh network they use part of their bandwidth to give backhaul to others. This function is scored and added to the PoS metric.

The Proof-of-Service is audited by other nodes and user equipment to ensure there is no cheating. Visiting members' user equipment validates the visited network. When a network has no auditing visitors or nodes, it may still participate in voting if it stakes tokens. A subsequent discovery that its PoC function was fraudulent would result in partial or total loss of stake. In general, this is not a great risk. Provided there is no attempt at protocol hijacking the only loser from such a fraud would be the usage payments for network node itself. Steps need to be taken in early network rollout to independently audit coverage to avoid mining fraud. This is handled by increasing the audit weighting for new node areas and delaying mining reward until sufficient independent corroboration has been achieved.

Each node in the network maintains a ledger of systems it will cooperate with and exchanges data to prove its cellular Proof-of-Service. Not all nodes need to be full nodes. There may be supernodes performing the complete PoS function and simpler client nodes of the full node that simply provide coverage but do not compute all the network functions.

Once trust is established, the network node can exchange cooperation data over a variety of interfaces including IMS, X2 and S1 interfaces. All the interfaces are not listed here because they are numerous in a cellular system. Suffice to say that each node should be capable of exposing any interface to another node as if it were part of the same network despite being autonomous network elements. The X2 interface presents a good example of this and is widely implemented by RAN equipment. The nodes each establish a proxy that appears to be a node of a common network and the nodes then exchange X2 packets as if they were part of the same network in order for the radio layers to cooperate with respect to anti-interference techniques, intercellular interference coordination (ICIC), handoff, and load balancing.

Sufficient nodes in the network with an aggregate PoS score above a threshold typically ⅔ of the network are required to approve the additions of blocks to the chain to prevent Byzantine failure. In the case where the whole network is not interconnected at any one moment—in the case of an emergency or temporary outage of connectivity—sub networks must verify their local blockchains and synchronise when temporarily unreachable network elements come back on line.

A given authenticated RAN coverage area pattern generated by a miner can be traded in a market with other carriers. Carriers enter into bi-lateral roaming agreements thru standard GSMA paperwork; legal agreements and test specifications. This allows a carrier to roam onto the coverage of another carrier and receive a range of services. In a normal hierarchical network, the coverage offered is for the whole MCC_MNC area which is typically a country but might be a single county in the USA model. An operator chooses which of their radio assets 101-103 or partners' assets (not shown) radiate their MCC_MNC identifier and which operators to attach to when they see a potential roaming partner broadcasting this radio identifier. In a preferred embodiment, the node radiates the same MNC_MCC combination for a given country ideally across the whole distributed network. (It is also possible to radiate the standard CBRS MNC_MCC private network code instead or as well and or a designated emergency code.) In this way, legacy carriers can view the footprint as a single legacy carrier footprint. Bilateral roaming agreements have little or no scope for varying the cost of coverage based on location and quality. This means that if an operator does not want to pay for coverage in a given area at the standard rate they limit coverage completely. In the scheme an API is presented through the CooP 605 node of FIG. 6. This presents the cost of coverage at a more granular locational level and with differential bilateral pricing. A RAN owner specifies the cost at which they would buy and sell coverage in a given coverage area usually selecting from one of a small number of standard recommended plans that are known to be acceptable to a broad range of telcos. A carrier wishing to buy service agrees to the plans it wishes to accept. A RAN user can see whether its plan is accepted and alter its offer. A series of rounds occur until a agreement is reached. Thereafter carriers settle roaming for that area at the agreed price plan. Plans do not necessarily have to be symmetrical, particularly in dense urban areas where an operator would prefer to use their network but might use a partner if it were inexpensive. Further details of core AAA and settlement mechanisms are given in FIG. 6.

Figure 2:
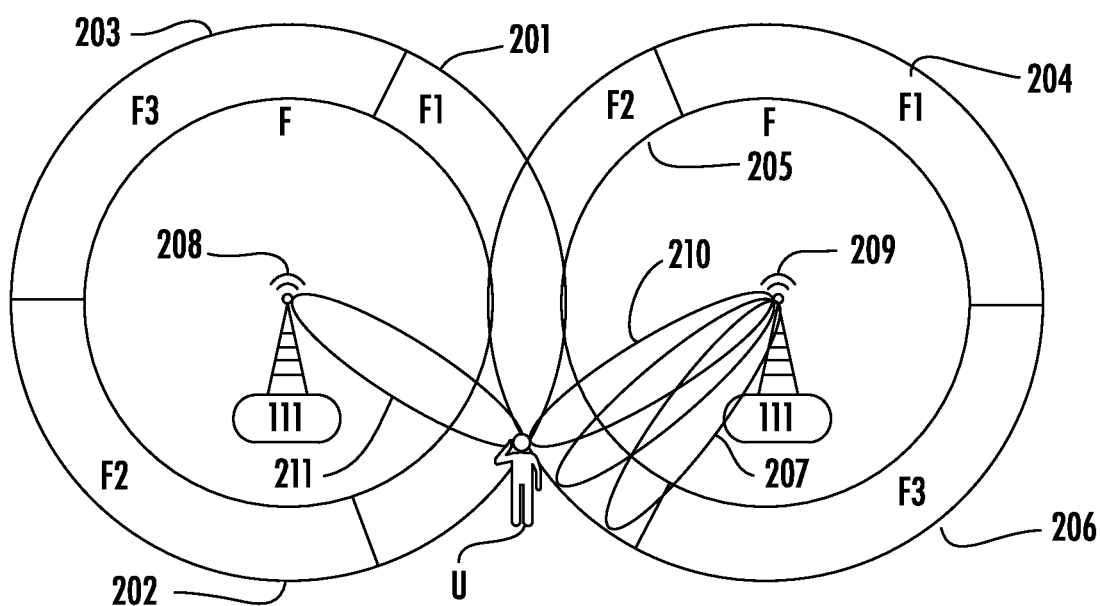
FIG. 2 illustrates a target illumination pattern, according to the embodiments as disclosed herein.

FIG. 2 illustrates a target illumination pattern, according to the embodiments as disclosed herein using the tools available to aid with the target illumination in the cooperative computational cellular internetwork dynamic network. Two transmitters 208, and 209 have overlapping coverage circles. In ICIC the outer areas of the circles are split into three zones. 201, 202, 203 for the first transmitter and 204, 205, and 206 for the second such that the overlapping circle segments have differing frequency subsets F1 and F2 respectively of the entire frequency band available F. This prevents interference between the cells at the cell edges while preserving the use of the entire frequency band F for most of the cell. Overlapping areas have moved to frequency F3. Consequently, each transmitter must emit directional beams with at least three sectors. However, as shown the transmitter 209 may have many more sectors affected by a beamforming method as described later. Here illustrated are three beams 207 from the transmitter 209 but many more are available, 12, 24, 64, and 128 being common numbers. Each of these beams can have its signal strength dynamically changed to effectively change the boundary location of the cell. Two beams 211 and 210 can be emitted with the same signal so, from the point of view of the UE, it receives one signal with twice the power. Even if the signals are only frequency locked and not phase synchronous, the UE will often be able to resolve the two signals using MIMO techniques, or the transmitter can randomly adjust the phase in successive transmissions to attempt to reach the handset. The benefit of using such a coordinated multipoint system (CoMP) is to remove handoff between cells or sectors, which may help when a user is in a cluttered environment such as trees or buildings. The user is connected to two sectors simultaneously rather than having to handoff from one to another. The transmitters are connected to a radio core (not shown) by way of a backhaul implementing a CPRI 7.2 split. Alternatively, each transmitter synthesizes its own local signal in a deterministic way such that they are both the same and synchronize via a clock signal either from the backhaul from a GPS transponder or atomic clock. In this way, the two transmitters independently run a deterministic GSM signal generation algorithm and synthesis the same waveform. The waveforms are transmitted to the receiver from two different transmitters with a time offset so that when received the signals constructively interfere to provide improved signal strength. The GSM transmit schemes allow this to be applied to each frequency channel so that differing propagation times for different frequencies can be handled. In particular, in the time-division multiplex schema receive and transmit channels are symmetrical and the receive timing can be used to modify the transmit timing. In a centralised cellular network this functionality would be implemented by the central core. However in the distributed system independent cores 111 must coordinate over the X2 and S1-MME interfaces on an Internet basis. This is done by establishing a peering between networks by way of a proxy embed in each distributed core. RAN core is labelled eNodeB eNB or basestation in 4G and the core is Control and User plane. For detailed implementation of a standard core the reader should reference Open5GS core or Magma for details or the ETSI 3GPP specifications.

Figure 3:
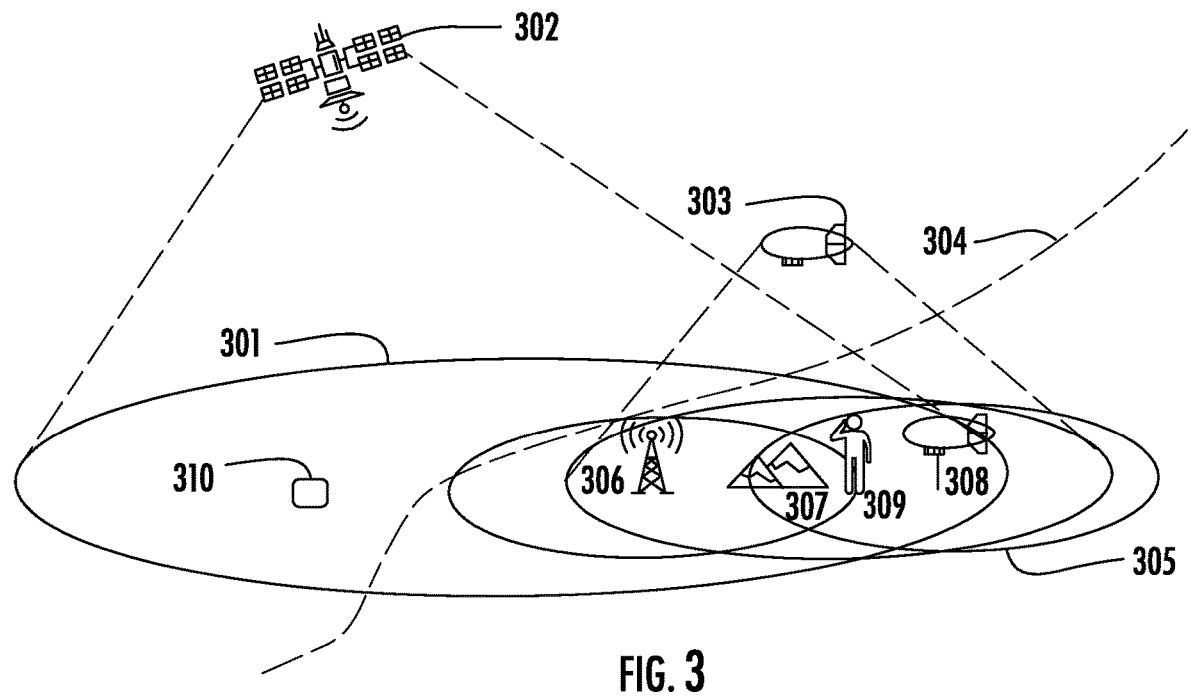
FIG. 3 illustrates the overlapping nature of cellular coverage based on a wide disparity of cell sizes.

FIG. 3 illustrates the overlapping nature of cellular coverage based on a wide disparity of cell sizes. It illustrates the nature of cellular services in different topographical scenarios. In a dynamic network, there will be many cell sizes, from very large cells to picocells. Some cells will naturally move. Satellites are always in motion orbiting the earth and therefore laying down constantly moving coverage. While other cells will move because they are owned by individual users who will simply reconfigure them to serve their immediate needs.

Very large cells 301, implemented by satellite 302 and HAPS platforms 303 may cross network boundaries between different radio jurisdictions 304. Areas 305 will be served by commercial networks most often implemented with cellular towers 306, rooftop installation, or cell sites mounted on hills 307 or aerostats 308. And will serve the user equipment of users 309. While corporations and campuses may be served by independent private LTE networks or homes by pico (home) cells 310. Each of these radio assets will have a backhaul (not shown) that connects them to a network (not shown). The backhaul may be via an optical link, microwave, fiber or facilitated by another cell that has overlapping coverage or additional available RF frequencies.

Independent networks arise due to licensing by jurisdiction or independent creation. One or more carriers may maintain a separate network within each jurisdiction, while private LTE networks are by their very nature independent installations.

Jurisdictions—countries, territories, and states are separated by borders 304 or natural barriers and define the frequency parameters available to radio services. Bordering jurisdictions may have entirely different frequency plans giving rise to independent networks or simply imposing licensing conditions leading to independent networks.

The nature of cellular networks is that they have fragmented into many independent networks which cooperate at a fairly simplistic level, only allowing roaming from one network to another by means of reauthentication onto a new radio bearer. The networks do not know much information about each other and can only avoid interference by using different frequencies or are substantially degraded if they use the same frequency. They also do not maintain services as the user 309 moves, lacking continuity of service.

The conventional arrangement is to license a few (national) carriers in each Jurisdiction, each of which is responsible for laying down a network for the whole jurisdiction. This form of licensing leads to inefficient use of spectrum. The natural tendency is for all networks to place their coverage in conurbations that have high population density and therefore high usage while leaving large areas uncovered. Even in countries that have mandatory roaming to encourage national coverage, trust is low and Location Area Code (LAC) restrictions are often imposed to prevent roaming that would have been beneficial to the user.

There is presently no mechanism for allowing independent networks to form together to provide contiguous service and join with existing networks to extend service. Roaming services only allow for disconnection from one service when coverage from the home network drops to zero as occurs at jurisdictional borders and connection to a new network. In these cases, there is generally a privileged "home network", while all others are visited networks. Some countries use smaller jurisdictional borders than country borders for cellular licensing—states, counties, territories, or special areas. In some cases, a single network entity (usually a corporate entity) may employ the same mobile country code and mobile network codes (MNC_MCC) for all jurisdictions in the country, permitting countrywide area roaming on their network but this does not extend to partner networks who must employ different MNC_MCCs.

The invention described herein provides a cooperation scheme so that cellular networks radio assets 302, 303, 306, 307, 308, 310 can form a cooperative network to offer seamless coverage to a user based on the network's service quality as a user travels across the terrain regardless of their core or home network. Each RAN node in the network exposes its X2 and 51 interfaces through a secure peer-to-peer mechanism to other authenticated nodes so that they can share handoff and anti-interference information, coordinate handoff, load balance and share interconnect services such as voices and data. Despite operating as a single network entity, the element can settle with each other as if they were independent.

Figure 4A:
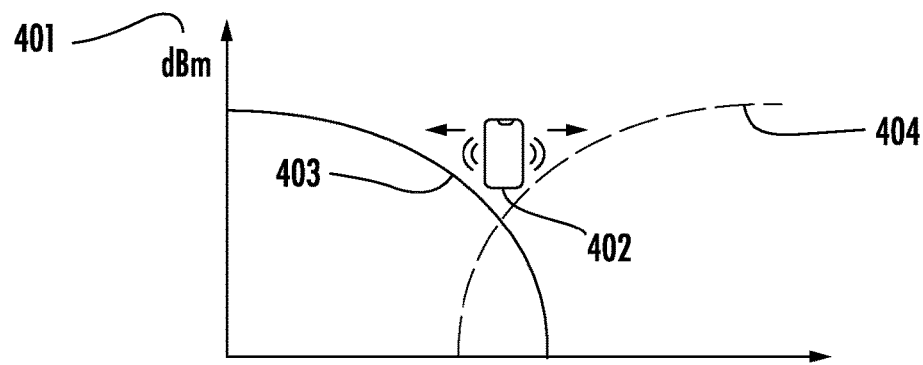
FIG. 4A depicts the handoff zone for normal cells.
Figure 4B:
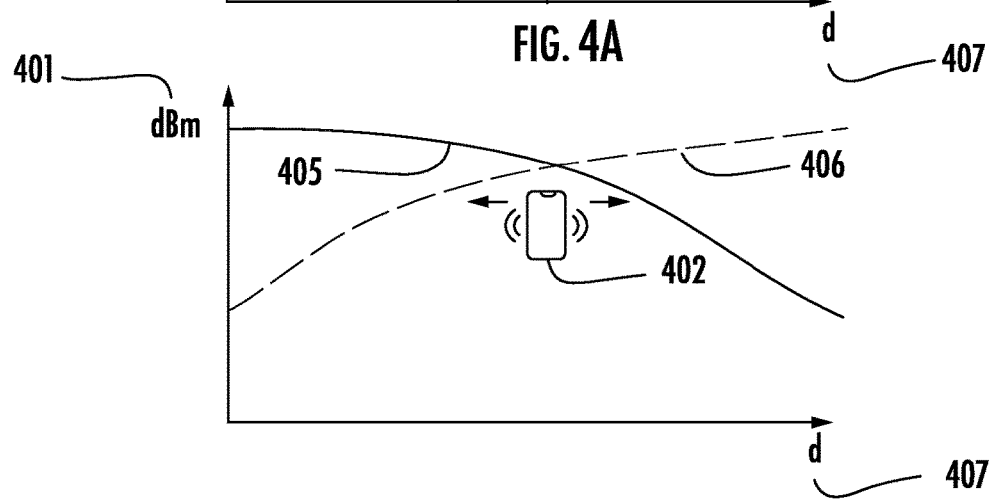
FIG. 4B depicts the handoff zone for very large cells implemented from high altitudes.

FIG. 4 illustrates the problem with high-altitude signals. This also applies to large landbased cells in certain coverage condition. The handoff zone for normal cells FIG. 4a and for very large cells implemented from high altitudes FIG. 4b are markedly different. High altitude means any circumstance where the tilt angle is large or where the transmitter and transmitted frequency are sufficiently high to keep the beam out of the Fresnel zone. This can occur with towers on hills and tall buildings and aerostats. In these cases, the normal land-based radio power fall-off equations do not operate, and signal propagation is governed by the free space propagation equation or, even worse, there is essentially no fall-off because the motion of the user does not significantly change the distance from the transmitter. Tilt angles in HAPS and satellite installations can be as much as 90 degrees, for instance, straight down. And high towers and aerostats can be 300 m or move above the ground where the Fresnel zone is only 10 meters. Therefore, most of the signal propagation is in the free space line of sight and falls off with a square-law relationship. Normally power falls off at the fifth power on land and is very abrupt between overlapping cells.

This allows a single frequency to be reused by adjacent cells. The signal strength 401 measured in dBm is plotted against distance 407. A small movement by a handset at the crossover point 402 of the cells in FIG. 4a sees a large change in signal strength from the originating cell 403 to the new cell 404 but in the high altitude case, the change in signal strength from the original 405 to new cell 406 is smaller and can be very gradual. During this handoff, there is harmful interference from the original to the new cell. To resolve this problem the dynamic network must make an estimate of differential signal strengths for the coverage area of the network using a modeling propagation modeling tool. For each square meter area, estimate the difference in signal strength from two transmitters. In addition, user equipment can measure signal strength in real-time. With a combination of real-time and estimated measures, the transmitters can be set to frequency reuse pattern in areas where the overlapping channels would have otherwise caused interference or the full range of techniques described in FIG. 5 can be employed. Again this is agreed on both an intranet and internet basis in the scheme. In addition, the partner network does not need to be a distributed network. It simply requires one node of the partner legacy network to provide a proxy into their network that allows exchange of S1 and X2 signals to coordinate interference. This is done by masquerading— with permission of course—as a node of the partner network for the purpose of RAN interoperability signaly.

Figure 5:
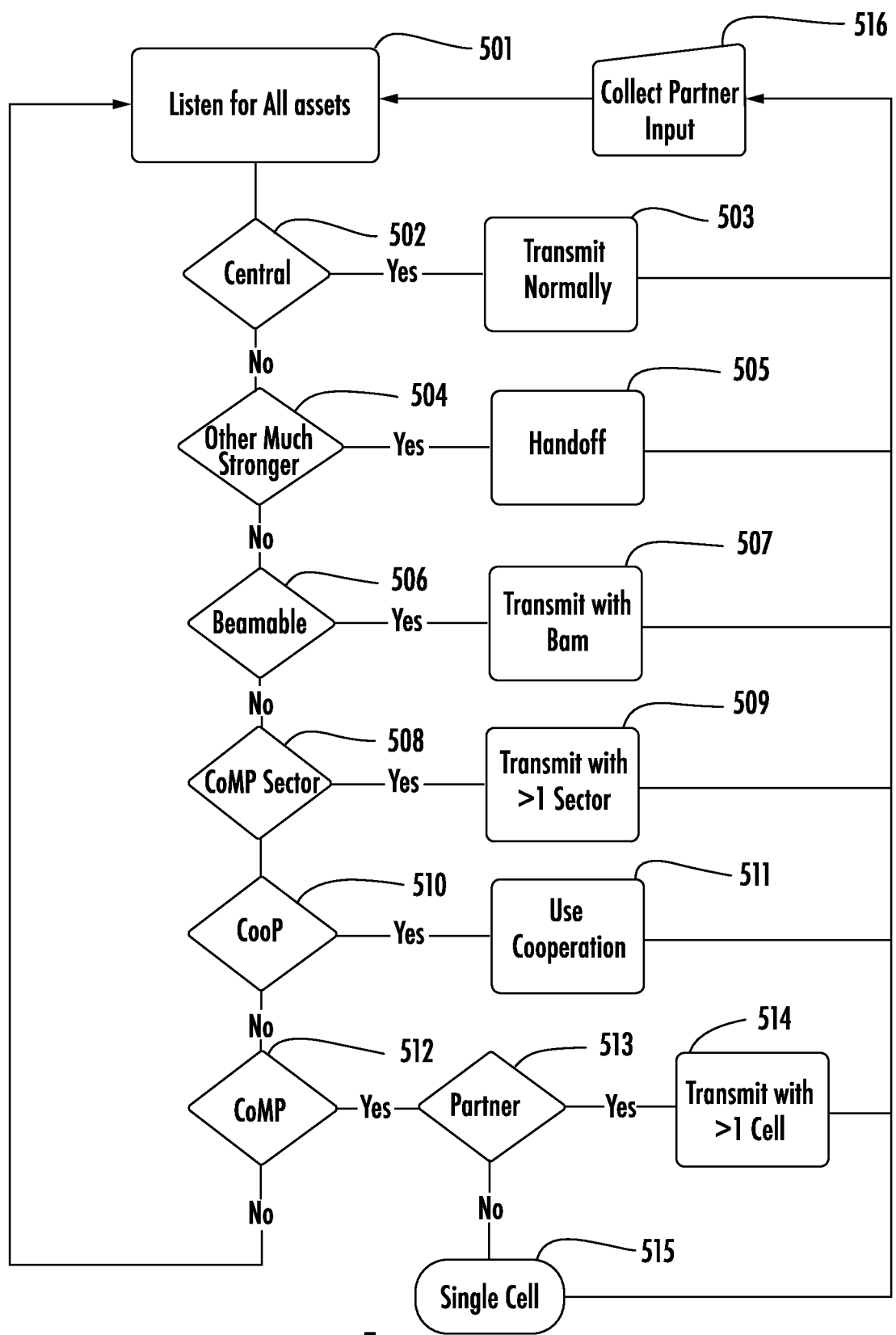
FIG. 5 is a flowchart illustrating a cooperation method between radio assets, according to the embodiments as disclosed herein.

FIG. 5 is a flowchart illustrating a cooperation method between radio assets, according to the embodiments as disclosed herein. In other words, FIG. 5 represents radio cooperation methods implemented by the distributed network or in conjunction with a proxy node for a legacy network. The system connects with other systems using the previously described cooperation system to establish an extended internetwork X2, S1 interface. The cell establishes the location of all UEs (including partners) in the system by listening for assets 501. Partners provide listening information for assets that have been recently lost at the edge of coverage and also for all signals. One of the partners agrees to search for assets on a cooperative basis using the signal data provided by other partners, the searching partner may be determined on a round-robin or other bases. Upon processing the signals, the system proceeds as follows. If the UE is in the central zone for the cell (or sector) 502 the UE transmits normally 503. If another cell has a much stronger 504 signal handoff is requested 505. Use Cell range expansion (CRE) if the other cell is a small cell to force handsets onto small cells and release capacity to the large cells— 3GPP release 11. The UE will then perform a handoff. If the UE could be reached with a stronger signal using beaming 506 the system will transmit with a beam 507. If the beam can be formed by multiple sectors 508 then beam with multiple sectors 509. Alternatively, to achieve acceptable high throughput (a coding scheme of at least 64QAM is working) one or more of the cooperation schemes listed below may be implemented:—
1. ICIC—move to fractional frequency reuse 3-3GPP release 8
2. eICIC—implement almost blank cells—ABS 3GPP release 10
3. FeICIC—share signaling information which can be used by handsets that support the standard to subtract the interfering signal.

If none of the above gives sufficient link quality at step 510 then implement CoMP 511 to transmit the signal on a multisector basis and if this fails 512 on a multipoint basis 514 if a partner can be identified 513. Cooperative multipoint (CoMP) 514 can be implemented at split 6 if the systems can derive a clock from GPS or an atomic clock or a network pulse or they may be served centrally on split 7.2, or 8. Beamforming and cooperative beamforming should be aware of geographical borders to avoid cross border interference and may further implement Interference mitigation through directionally controlled down tilt and power adjustment for the fixed ground location. Otherwise, single cell transmission is used in step 515.

If the UE search discovers access points requesting IAB a serving node will supply it with backhaul.

Further, the system cores cooperate to offer core services and offer or receive services from other networks, for instance, IMS call delivery or 112/999/911 services.

Figure 6:
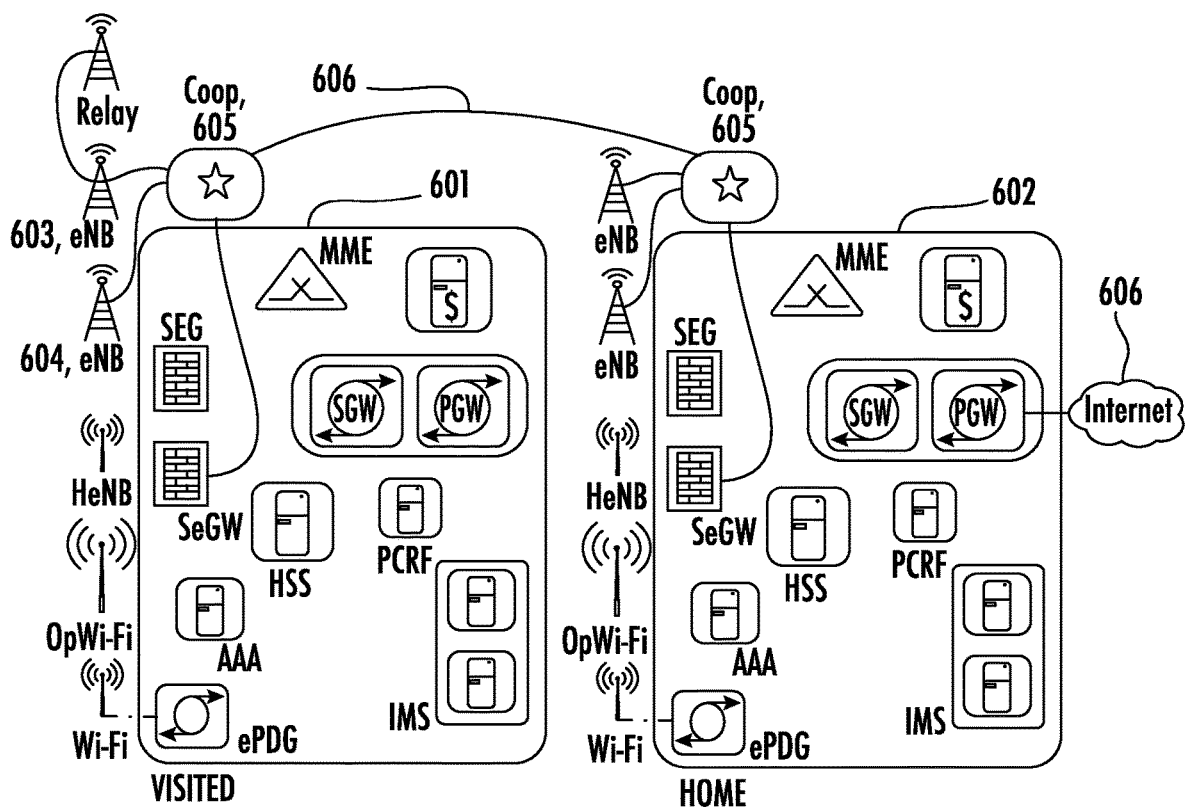
FIG. 6 is a network block diagram showing the elements of the distributed system, according to the embodiments as disclosed herein.

FIG. 6 is a network block diagram showing the elements of the distributed system, according to the embodiments as disclosed herein. FIG. 6 shows an identical visited 601 and home 602 networks. This is usually the case in cellular networks as most networks offer a full service. In the rare scenario of a heavy Mobile Virtual Network Operator (MVNO), the home network lacks a radio component (MME, eNBs, and associated relay nodes). Normally the interface between enhanced Node Bs (eNBs) 603 and 604 is a direct X2 interface link. This link may be transported securely with an IPSEC tunnel if it is traveling over the internet 606. This is the case with any link in the system. The cooperative extension introduces a CooP node 605 that pins the X2 interfaces and also picks up normal roaming interfaces including AAA, S8, S1 and IMS). A normally skilled reader will be well aware of the setup of an LTE network which are not redescribed here. One aspect of the invention is to allow the X2 and S1 interface and associated roaming information to be coordinated. Perform the X2 and S1 agreement by using the O-RAN standards on an internetwork basis to provide cooperation between assets regardless of whether they are on the same operator network or different operator networks. The system must behave and signal as if it is a member of the visited network despite being a separate network. This is done through implementing proxy methods for each of the coordination requests. Simultaneously the core may need to handoff attachment and authentication to ensure continuity of service as well has holding open any real time data or IMS session using mobile IP and reconnecting them after handoff/handover.

Figure 7A:
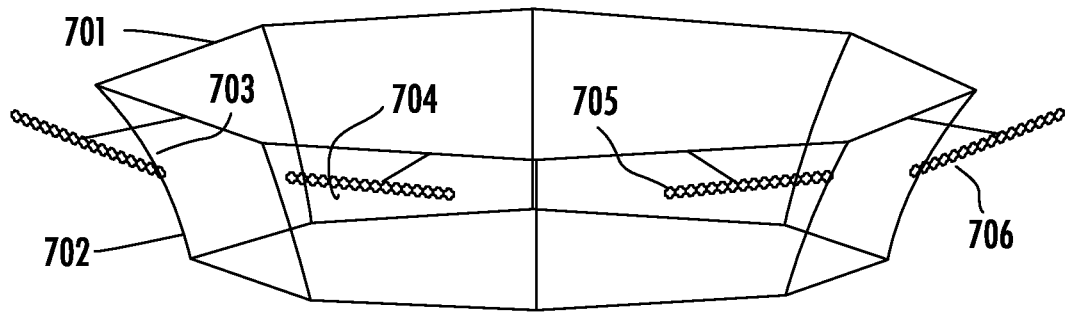
FIG. 7A depicts a single-tier multi-sector hybrid parabolic phased-array antenna in accordance with an embodiment of the invention.
Figure 7B:
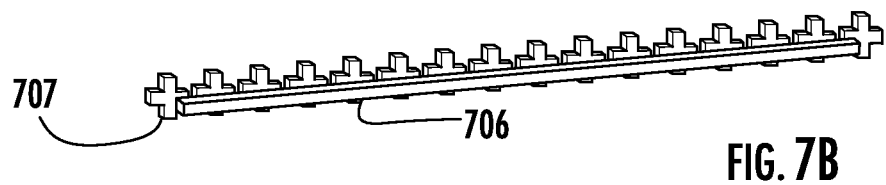
FIG. 7B depicts a multi-component horizontal/vertical axis bipolar antenna feed in accordance with an embodiment of the invention.

FIG. 7 is a drawing of a Hybrid Phased Array with a parabolic scheme, according to the embodiments as disclosed herein. FIG. 7a is a single-tier multi-sector—16 in this figure—hybrid parabolic phased-array antenna. The edge 701 of a one-dimensional offset parabolic 702 antenna is fed with a series of multi-component horizontal/vertical axis bipolar antenna feeds, the front-facing ones shown in illustrations 703, 704, 705, 706 and shown in larger view in FIG. 7b. Each antenna element 707 of the array—16 are shown here—is separated by k/2 (half-wavelength), 3λ/2. 5λ/2 7λ/2 to minimize the coupling between them (mutual coupling). Alternately, any form of feed is acceptable for example horns or patch antenna could also be used. The directionality of the antenna in a vertical direction is provided by the parabolic reflection. This height is approximately 0.5 meters giving a gain of +15 bB. FIG. 7b shows the T-Bar at a larger scale. Sixteen bipolar feeds comprised of orthogonal small printed circuit boards form a phases array in the horizontal direction giving approximately the same gain as the parabola in the vertical direction. In the design, a beam can be practically steered up to 70 degrees allowing feeds from multiple zones to form coordinated multipoint paths. The panels are normally arranged in a circle but can be separated to fit within a rectangle. Caps may be placed on the ends to prevent interference through backscattering. This is known as a pillbox. In a preferred configuration, a dual frequency dipole antenna is used with band 20 and 5.8 GHz Wi-Fi. Antenna spacing of λ/2 for band 20 is used which gives a near match for the 5.8 GHz frequency. As illustrated the parabolic reflector as provided with an offset feed but the feed can be central if needed.

Figure 8:
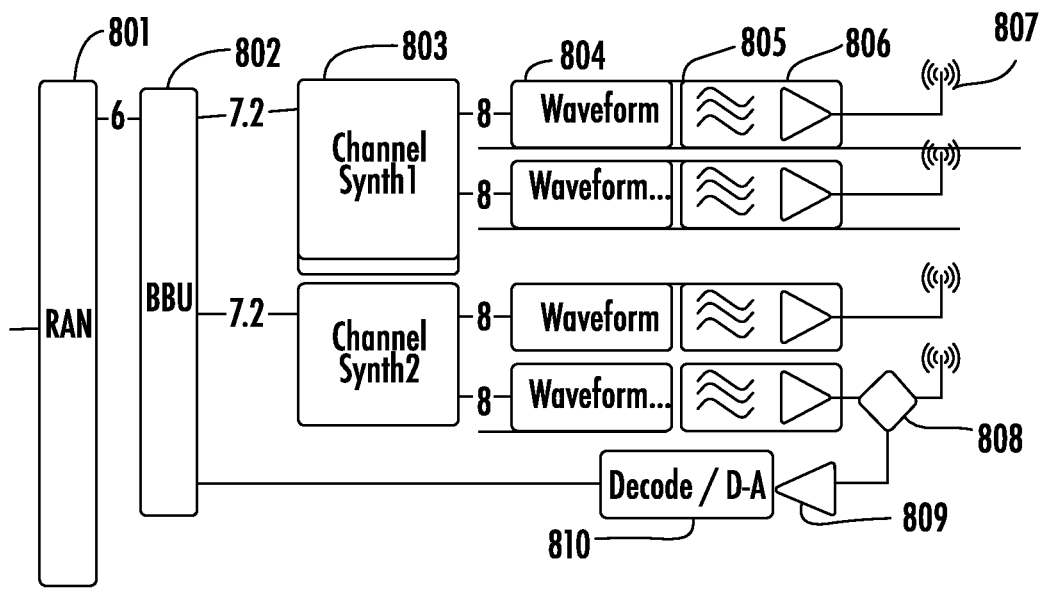
FIG. 8 is a drawing of the feed arrangement for the Hybrid array, according to the embodiments as disclosed herein.

FIG. 8 is a drawing of the feed arrangement for the Hybrid array, according to the embodiments as disclosed herein. Each of the orthogonally polarized dipoles is driven by a separate computational hierarchical chain. A RAN Core 801 provides control and data signals to a BBU 802 which computes data that is sent to a number of channel synthesizers 803. Each channel synthesizes performs initial computation and sends this to a waveform computer 804 which generates the analog waveform to drive the antenna 807 for each horizontal or vertical channel via a power amplifier 805 and filter arrangement 806. In the receive configuration, a duplexer 808 feeds the input signal to a low-noise radio receiver 809 and decode 810 which feeds the remaining decode at the BBU. Sectors typically comprise 32 channels—16 vertical and 16 horizontal. Cell sites usually employ a minimum of three sectors. The system typically proposes 12 sectors. Channels from adjacent cells sectors can be combined using coordinated multipoint to improve extended range.

Figure 9:
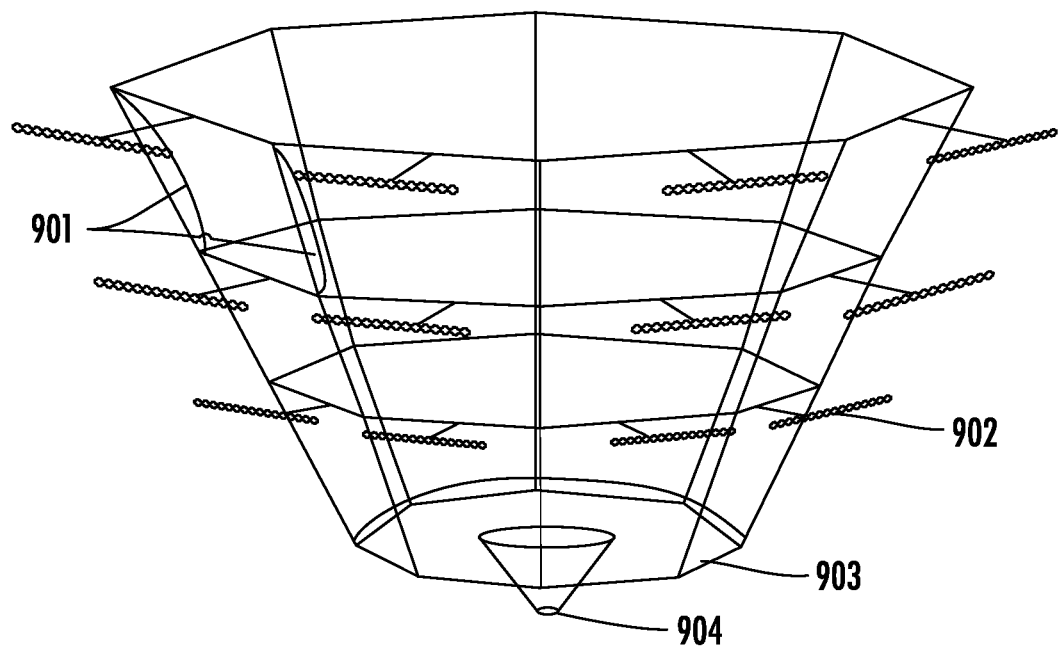
FIG. 9 is a drawing of a Hybrid Phased Array with a parabolic scheme, according to the embodiments as disclosed herein.

FIG. 9 is a drawing of a stacked Hybrid Phased Array/parabolic scheme, according to the embodiments as disclosed herein. The hybrid phased-array parabolic antenna is configured with multiple horizontal zones. Three are depicted along with a down fill zone, but the number could be as low as one as depicted in FIG. 7 and much higher if there is available space. This scheme illustrates a diminishing radius for each layer but the radius of the layers could be the same forming a cylinder. As before each of the one-dimensional parabolic antennas is fed with a phased array 902 to provide dynamic steering and dynamic sectoring of the horizontal dimension. The bottom of the array 903 is filled in with one or more down-pointing parabolic dishes fed by central feeds 904. In the depiction, each panel is shown as a trapezoid but each is actually a parabola as indicated by the curved lines 901. It is quite common in a preferred embodiment to leave the web in place between elements to provide stiffening and reduce side scatter, thus the diagram is correct but for the fact that every trapezoidal element needs to have a parabolic reflector inserted as depicted schematically with the lines 901. This stack paints a series of concentric rings of coverage on the ground.

Figure 10A:
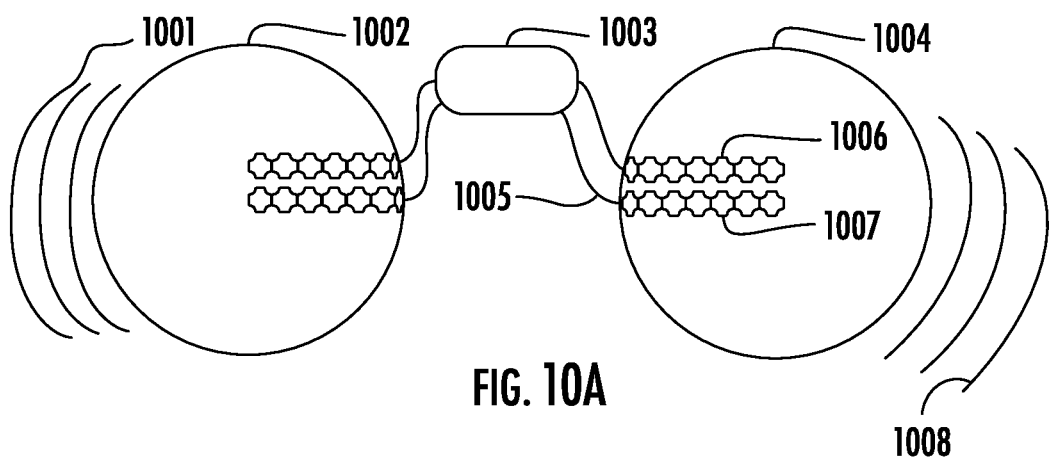
FIG. 10A is an elevation of a split Lundberg Antenna with a high-density feed in accordance with an embodiment of the invention.
Figure 10B:
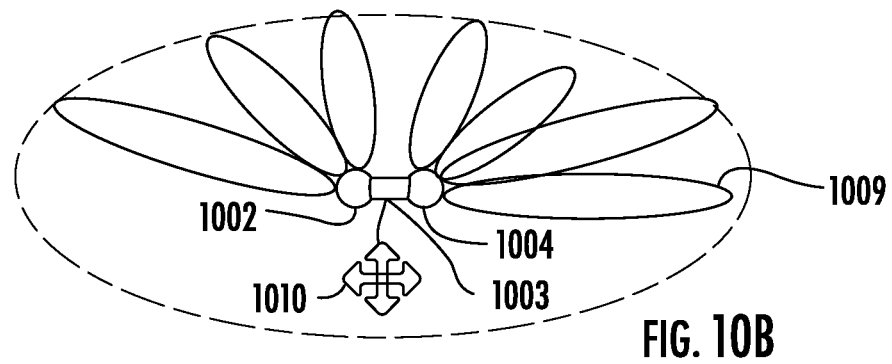
FIG. 10B depicts the radiated pattern schematically with a smaller number of zones than would be generated by a fully populated system.

FIG. 10 is a drawing of a Split Lundberg Antenna scheme, according to the embodiments as disclosed herein. FIG. 10 is an elevation of a split Lundberg Antenna 1002, 1004 with a high-density feed from a control system 1003 to cross point dipole antennas 1005. The split enables the two antennas to be placed so the input wiring does not interfere with the radiated pattern. One or more rows of antennae 1006, and 1007 are placed in a semi-circle around the Lundberg lens. If this is done at the equator a horizontal radiation pattern 1001 is generated. The semicircle further up towards a pole radiates a pattern titled down 1008. It may be convenient to use this along with modulation of power to restrict the radiation pattern to a non-circular shape 1009. FIG. 10b shows the radiated pattern schematically with a smaller number of zones than would be generated by a fully populated system. A fully populated system might have as many as 64 horizontal and vertical polarized elements. Therefore, the signal can be beamed with adjustable tilt angle and power to best form an illuminated area on the ground. If the aerostat rotates the beam angle and power pattern are maintained on the ground using heading input 1010 provided by a compass, GPS, or similar directional sensor to the computational signal synthesis 1003. Therefore, a consistent pattern can be maintained on the ground despite the motion of the aerial platform.

The system can be generalized to use X, Y, and Z location and pitch, yaw, and heading as inputs to the signal synthesis engine to maintain ground illumination despite the motion of the transmitting platform. Transmitting platforms are proposed to be aerostats but can be any form of platform including boats, planes, trucks, trains, high-altitude platforms, satellites, and so on. The key is to use a mix of synthesized signals and aperture lenses to provide continuous coverage to UEs.

Figure 11:
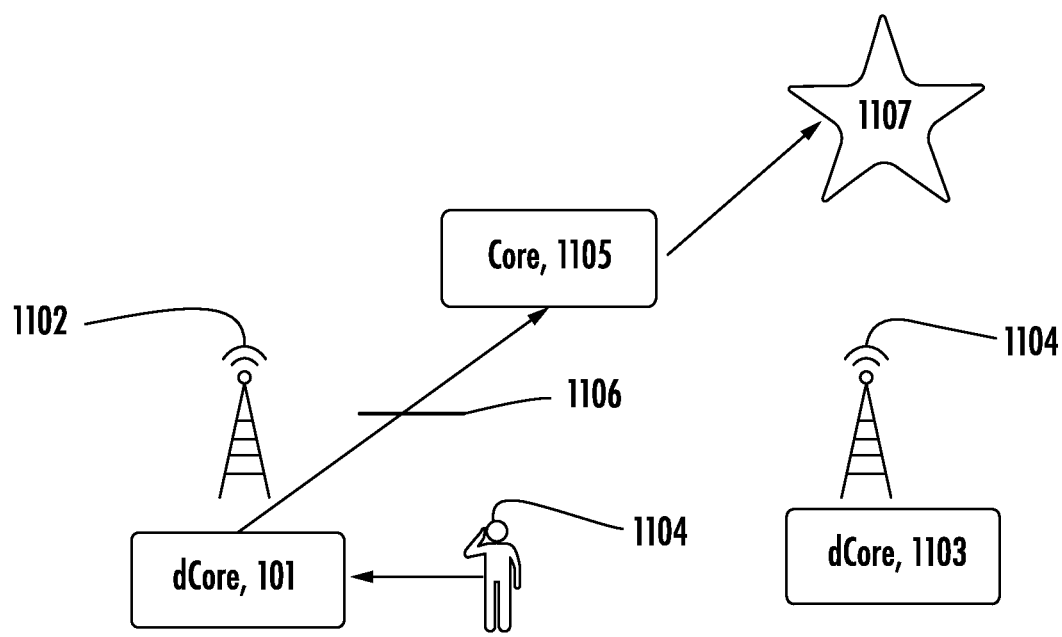
FIG. 11 depicts a distributed authentication schema in accordance with an embodiment of the invention.

FIG. 11 The normal cellular system will allow emergency calls to an Public Safety Answering Points (PSAP) 1107 in the USA, or similar arrangement outside. In the case of loss of connectivity to the authentication unit of the HLR—a SIM does not even need to be present in the phone. BUT the RAN core does need connectivity to the PSAP. This capability does not help with data connectivity, person-to-person calls, and other services such as SMS and MMS nore with scenarios where the backhaul to the core has been severed 1106. Although the system can make a call it can't reach the core to route to the PSAP. A system is needed to allow handsets to continue to operate if the central authentication function is not available and/or the core is detached.

In a distributed network a central authentication unit—constituting a single point of failure—is against the very philosophy of the system. The figure illustrates a plurality of dNodes in a distributed network 1101, 1103 that can provide authentication to the user equipment using the GSMA pre-shared key mechanism. Once a trusted relationship has been established between the home network HLR in the core 1105 and the handset further provisioning of IMSIs and keys can occur over the air. Pre-shared server keys can be sent securely to handsets and network nodes to provide bi-directional authentication of the server and handset. Handsets and nodes are each provisioned with an emergency MNC_MCC keypair. In the case of full network failure, a node will broadcast emergency only MNC_MCC. The handset will display emergency coverage alerting the user. The preset keys will authenticate the user on the local HLR provided in every node in the network. From time to time this pre-shared backup keyset will be refreshed to ensure errant nodes are not able to masquerade as nodes of the network. The keys are stored in encrypted code constants and the hash-code mechanism is used to authenticate the node build. Challenge response codes can be generated from the keys without decoding the keys in plain text using holomorphic encryption. In a preference embodiment at lease two dNodes are used. One which servers and the visited RAN network routing the authentication vectors and one generating the vectors. In this way two nodes would need to be compromised to acquire the secret keys and even then it is difficult to extract the keys since they are never present in plane text format.

Because the handset only use these keys when it sees a network node in the emergency mode it is difficult to build a man in the middle attack that is not obvious to the user. User equipment such as a handset 1104 accesses radio resources 1102, 1104. In normal operation AAA requests are forwarded to the core 1105 and authentication is performed centrally on the core 1105. In the event of a temporary or permanent break in the connection between the core and distributed element the radios begin transmitting MNC_MCC emergency mode. Similarly, the network can revert back to a private network mode using a private network key previously shared and display PRIVATE NETWORK to alert the user. In this way, the handset can authenticate with the node and vice versa. Multiple eSIM images could also be used to offer this function. Users should understand that in private network and emergency network mode their data is visible in plain text to the node. Cellular systems are only encrypted over the air. This is similar to Wi-Fi. Cellular communications are far from secure. Over-the-air encryption is good but not strong and all data is unencrypted within the mobile operator core. Of course, using an end-to-end encrypted system such as a VPN, Telegram or similar gives a high degree of security.

Figure 12:
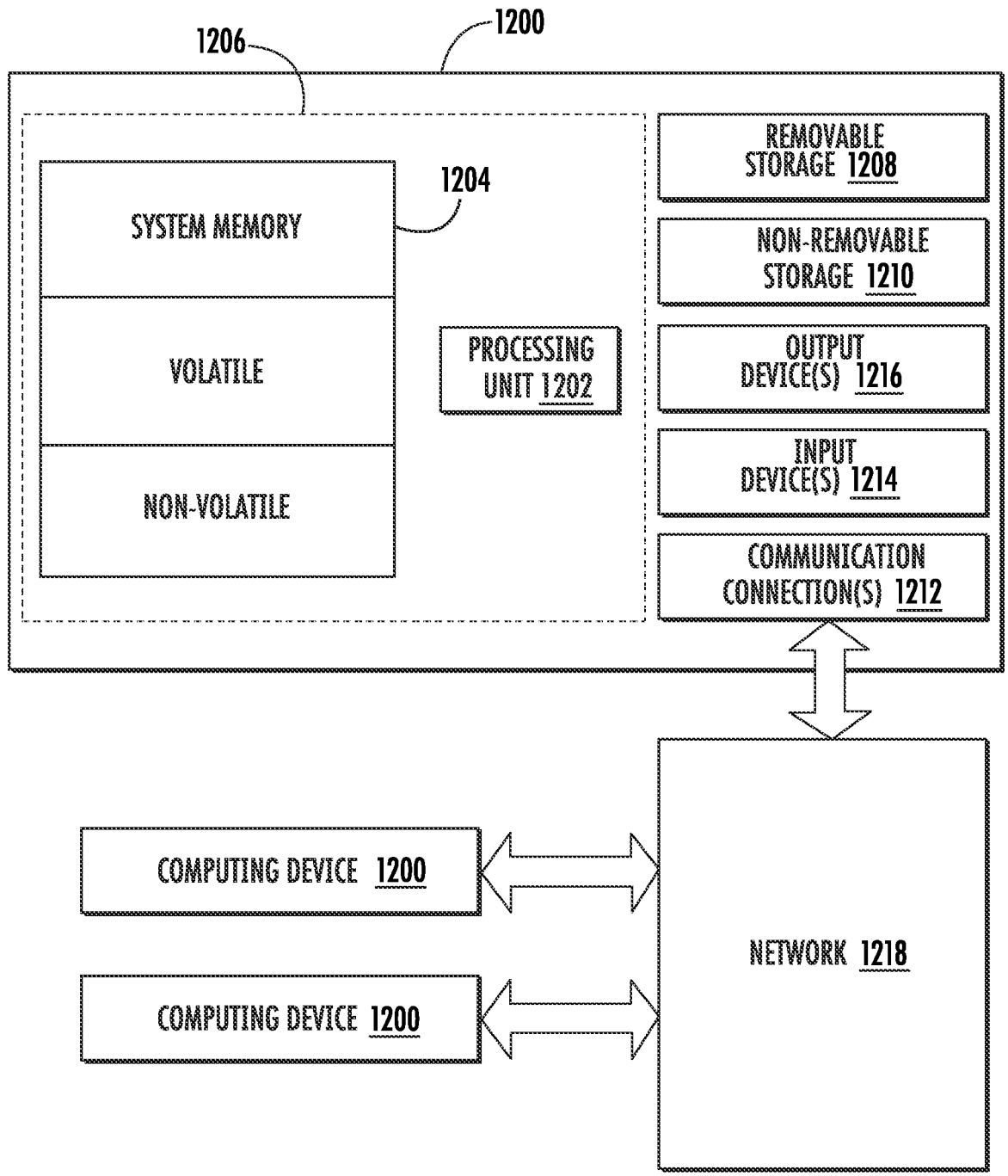
FIG. 12 is a block diagram of an exemplary computing environment within which various embodiments of the invention may be implemented and upon which various embodiments of the invention may be employed.

FIG. 12 depicts an exemplary computing environment in which various embodiments of the invention may be implemented and upon which various embodiments of the invention may be employed. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal electronic devices such as smart phones and smart watches, tablet computers, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 12, an exemplary system for implementing aspects described herein includes a computing device, such as computing device 1200. In its most basic configuration, computing device 1200 typically includes at least one processing unit 1202 and memory 1204. Depending on the exact configuration and type of computing device, memory 1204 may be volatile (such as random access memory (RAM)), non-volatile (such as read-only memory (ROM), flash memory, etc.), or some combination of the two. This most basic configuration is illustrated in FIG. 12 by dashed line 1206. Computing device 1200 may have additional features/functionality. For example, computing device 1200 may include additional storage (removable and/or non-removable) including, but not limited to, magnetic or optical disks or tape. Such additional storage is illustrated in FIG. 12 by removable storage 1208 and non-removable storage 1210. Computing device 1200 as used herein may be either a physical hardware device, a virtual device, or a combination thereof.

Computing device 1200 typically includes or is provided with a variety of computer-readable media. Computer-readable media can be any available media that can be accessed by computing device 1200 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 1210 are all examples of computer storage media. Computer storage media includes, but is not limited to, Random Access Memory (RAM), Read-Only Memory (ROM), electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can accessed by computing device 1200. Any such computer storage media may be part of computing device 1200.

Computing device 1200 may also contain communications connection(s) 1212 that allow the device to communicate with other devices. Each such communications connection 1212 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. The term computer-readable media as used herein includes both storage media and communication media.

Computing device 1200 may also have input device(s) 1214 such as keyboard, mouse, pen, voice input device, touch input device, etc. Output device(s) 1216 such as a display, speakers, printer, etc. may also be included. All these devices are generally known and therefore need not be discussed in any detail herein except as provided.

Notably, computing device 1200 may be one of a plurality of computing devices 1200 inter-connected by a network 1218, as is shown in FIG. 12. As may be appreciated, the network 1218 may be any appropriate network; each computing device 1200 may be connected thereto by way of a connection 1212 in any appropriate manner, and each computing device 1200 may communicate with one or more of the other computing devices 1200 in the network 1218 in any appropriate manner. For example, the network 1218 may be a wired or wireless network within an organization or home or the like, and may include a direct or indirect coupling to an external network such as the internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as universal serial bus (USB) flash drives, Secure Digital (SD) memory cards, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations. In an embodiment, the system can be developed using Go.

Although exemplary embodiments may refer to utilizing aspects of the presently disclosed subject matter in the context of one or more stand-alone computer systems, the subject matter is not so limited, but rather may be implemented in connection with any computing environment, such as a network 1218 or a distributed computing environment. Still further, aspects of the presently disclosed subject matter may be implemented in or across a plurality of processing chips or devices, and storage may similarly be effected across a plurality of devices in a network 1218. Such devices might include personal computers, network servers, and handheld devices, for example.

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art. For clarity, "at least one of A or B" means either A, or B, or both A and B.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Therefore, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, on the contrary, the intention is to cover all modifications, alternative constructions, and equivalents falling within the spirit and scope of the invention, as defined in the appended claims. Accordingly, the disclosure of the present invention is intended to be illustrative, but not limiting, of the scope of the invention, which is set forth in the following claims.

What is claimed is:

1. A computer-based system of establishing a decentralized dynamic cellular communication network, comprising: first software utilized by each of a plurality of cellular nodes, said first software: enabling each of the cellular nodes to communicate with other of the cellular nodes and with cellular user equipment within range; and determining cellular service quality of the respective cellular nodes by way of at least one of the cellular user equipment and other of the cellular nodes; and second software utilized by a plurality of validator nodes each residing on a computer, said second software component: enabling the validator nodes to communicate with the cellular nodes; and validating the cellular service quality determined by the cellular nodes, wherein as the cellular nodes begin utilizing said first software, the cellular nodes are dynamically added to the decentralized dynamic cellular communication network; said system employing a blockchain consensus mechanism;
   wherein: the cellular nodes self-verify their wireless service; the verifications are audited by the cellular user equipment connected to the cellular nodes; each of the self-verifying cellular nodes receives a token for verifying coverage according to a proof of service function; and the self-verifying cellular nodes stake tokens against a subsequent audit by the validator nodes connected to the cellular user equipment.

2. A computer-based system of establishing a decentralized dynamic cellular communication network according to claim 1, wherein said first software comprises at least one of a configuration file pointing to the decentralized dynamic cellular communication network or an app downloaded by the cellular node to connect to the decentralized dynamic cellular communication network.

3. A computer-based system of establishing a decentralized dynamic cellular communication network according to claim 1, said determining of cellular service quality includes at least two of radio footprint, contiguous footprint, and bandwidth.

4. A computer-based system of establishing a decentralized dynamic cellular communication network according to claim 1, said validating the cellular service quality uses one or more cellular location technologies along with user equipment reports.

5. A computer-based system of establishing a decentralized dynamic cellular communication network according to claim 1, said blockchain consensus mechanism validating new blocks based on a consensus of a subset of the cellular nodes based on the service quality.

6. A computer-based system of establishing a decentralized dynamic cellular communication network according to claim 1, wherein the proof of service function includes a function that calculates a score based on cellular quality metric from the following set of parameters:
   range_adjusted_throughput, successful_handoff_score, QoS, first_mover_bonus, seed_node.

7. A computer-based method of establishing a decentralized dynamic cellular communication network, comprising the steps of: providing first software to each of a plurality of cellular nodes; enabling, with the first software, each of the cellular nodes to communicate with other of the cellular nodes and with cellular user equipment within range; determining cellular service quality of the respective cellular nodes by way of at least one of the cellular user equipment and other of the cellular nodes; providing second software to a plurality of validator nodes each residing on a computer; enabling, with the second software, the validator nodes to communicate with the cellular nodes; validating, with the second software, the cellular service quality determined by the cellular nodes; and dynamically adding the cellular nodes to the decentralized dynamic cellular communication network as they begin utilizing the first software; employing a blockchain consensus mechanism; and validating, via the blockchain consensus mechanism, new blocks based on a consensus of a subset of the cellular nodes based on the service quality; the cellular nodes self-verifying their wireless service; auditing the verifications by the cellular user equipment connected to the self-verifying cellular nodes; each of the self-verifying cellular nodes receiving a token for verifying coverage according to a proof of service function; and the self-verifying cellular nodes staking tokens against a subsequent audit by the validator nodes connected to the cellular user equipment.

8. A computer-based method of establishing a decentralized dynamic cellular communication network according to claim 7, wherein the first software includes at least one of a configuration file pointing to the decentralized dynamic cellular communication network or an app downloaded by the cellular node to connect to the decentralized dynamic cellular communication network.

9. A computer-based method of establishing a decentralized dynamic cellular communication network according to claim 7, said determining of cellular service quality step including utilizing at least two of radio footprint, contiguous footprint, and bandwidth.

10. A computer-based method of establishing a decentralized dynamic cellular communication network according to claim 7, said validating the cellular service quality step including utilizing one or more cellular location technologies along with user equipment reports.

11. A computer-based method of establishing a decentralized dynamic cellular communication network according to claim 7, further comprising the step of the proof of service function calculating a score based on cellular quality metric from the following set of parameters: range_adjusted_throughput, successful_handoff_score, QoS, first_mover_bonus, seed_node.

12. A non-transitory computer-readable storage medium, comprising one or more programs for executing a computer-based method of establishing a decentralized dynamic cellular communication network via one or more processors, wherein the computer-based method: provides first software to each of a plurality of cellular nodes; enables, with the first software, each of the cellular nodes to communicate with other of the cellular nodes and with cellular user equipment within range; determines cellular service quality of the respective cellular nodes by way of at least one of the cellular user equipment and other of the cellular nodes; provides second software to a plurality of validator nodes each residing on a computer; enables, with the second software, the validator nodes to communicate with the cellular nodes; validates, with the second software, the cellular service quality determined by the cellular nodes; and dynamically adds the cellular nodes to the decentralized dynamic cellular communication network as they begin utilizing the first software; employs a blockchain consensus mechanism; and validates, via the blockchain consensus mechanism, new blocks based on a consensus of a subset of the cellular nodes based on the service quality; the cellular nodes self-verify their wireless service; the cellular user equipment connected to the self-verifying cellular nodes audits the verifications; each of the self-verifying cellular nodes receive a token for verifying coverage according to a proof of service function; and the self-verifying cellular nodes stake tokens against a subsequent audit by the validator nodes connected to the cellular user equipment.

13. A non-transitory computer-readable storage medium according to claim 12, wherein the first software includes at least one of a configuration file pointing to the decentralized dynamic cellular communication network or an app downloaded by the cellular node to connect to the decentralized dynamic cellular communication network.

14. A non-transitory computer-readable storage medium according to claim 12, said computer-based method further determines cellular service quality by utilizing at least two of radio footprint, contiguous footprint, and bandwidth.

15. A non-transitory computer-readable storage medium according to claim 12, said computer-based method further validates the cellular service quality by utilizing one or more cellular location technologies along with user equipment reports.

16. A non-transitory computer-readable storage medium according to claim 12, said computer-based method further includes that the proof of service function calculates a score based on cellular quality metric from the following set of parameters:
range_adjusted_throughput, successful_handoff_score, QoS, first_mover_bonus, seed_node.

* * * * *